US012562419B2

(12) United States Patent
Kim et al.

(10) Patent No.: US 12,562,419 B2
(45) Date of Patent: Feb. 24, 2026

(54) BUTTON-TYPE SECONDARY BATTERY

(71) Applicant: LG ENERGY SOLUTION, LTD., Seoul (KR)

(72) Inventors: Min Gyu Kim, Daejeon (KR); Joo Hwan Sung, Daejeon (KR); Yong Gon Lee, Daejeon (KR); Je Jun Lee, Daejeon (KR); Jae Won Lim, Daejeon (KR); Geon Woo Min, Daejeon (KR); Min Su Cho, Daejeon (KR); Sang Hak Chae, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 488 days.

(21) Appl. No.: 18/025,819

(22) PCT Filed: Sep. 16, 2021

(86) PCT No.: PCT/KR2021/012696
§ 371 (c)(1),
(2) Date: Mar. 10, 2023

(87) PCT Pub. No.: WO2022/060122
PCT Pub. Date: Mar. 24, 2022

(65) Prior Publication Data
US 2024/0021928 A1 Jan. 18, 2024

(30) Foreign Application Priority Data
Sep. 21, 2020 (KR) ........................ 10-2020-0121826

(51) Int. Cl.
*H01M 50/109* (2021.01)
(52) U.S. Cl.
CPC ................................ *H01M 50/109* (2021.01)

(58) Field of Classification Search
CPC .................................................... H01M 50/109
See application file for complete search history.

(56) References Cited

U.S. PATENT DOCUMENTS

RE31,413 E 10/1983 Jaggard
6,696,198 B2 2/2004 Okahisa et al.
(Continued)

FOREIGN PATENT DOCUMENTS

CN 106129274 A 11/2016
CN 206432308 U 8/2017
(Continued)

OTHER PUBLICATIONS

CN107195807A translation (Year: 2017).*
(Continued)

*Primary Examiner* — Jane J Rhee
(74) *Attorney, Agent, or Firm* — Morgan, Lewis & Bockius LLP

(57) ABSTRACT
A button-type secondary battery includes a lower can; an upper can is coupled to the lower can; an electrode assembly is on the lower can in an accommodation space defined between the lower can and the upper can. The lower can includes a first planar part, on which the electrode assembly is seated, and a first sidewall disposed vertically along a circumference of the first planar part such that a concave portion is defined in the first sidewall. The upper can includes a second planar part, which has an area that covers an opened top surface of the lower can, and a second sidewall disposed vertically along a circumference of the second planar part such that a convex portion is on an inner surface of the second sidewall. When the sidewall is coupled to be placed outside the first sidewall, the convex portion is fitted into the concave portion.

8 Claims, 5 Drawing Sheets

(56) References Cited

U.S. PATENT DOCUMENTS

| 2007/0224500 | A1 | 9/2007 | White et al. |
|---|---|---|---|
| 2009/0325062 | A1 | 12/2009 | Brenner et al. |
| 2021/0091401 | A1 | 3/2021 | Dong |
| 2021/0111454 | A1 | 4/2021 | Zhu et al. |
| 2021/0203034 | A1 | 7/2021 | Yoon et al. |

FOREIGN PATENT DOCUMENTS

| CN | 107195807 | A | 9/2017 |
|---|---|---|---|
| CN | 107425145 | A | 12/2017 |
| CN | 207587785 | U | 7/2018 |
| CN | 110854305 | A | 2/2020 |
| CN | 211182396 | U | 8/2020 |
| JP | S60-241641 | A | 11/1985 |
| JP | 2002-134096 | A | 5/2002 |
| JP | 2005-353290 | A | 12/2005 |
| JP | 2006-032313 | A | 2/2006 |
| JP | 2006-134740 | A | 5/2006 |
| JP | 2009-517818 | A | 4/2009 |
| JP | 2009-530786 | A | 8/2009 |
| JP | 2010-040554 | A | 2/2010 |
| JP | 2012-209178 | A | 10/2012 |
| JP | 5512972 | B2 | 6/2014 |
| JP | 2019-523520 | A | 8/2019 |
| KR | 10-1996-0036187 | A | 10/1996 |
| KR | 10-2011-0100473 | A | 9/2011 |
| KR | 10-1374849 | B1 | 3/2014 |
| KR | 10-1464220 | B1 | 11/2014 |
| KR | 10-2019-0010566 | A | 1/2019 |
| KR | 10-2020-0005346 | A | 1/2020 |
| WO | 2020/147243 | A1 | 7/2020 |

OTHER PUBLICATIONS

CN110854305A translation (Year: 2020).*
Office Action issued Apr. 30, 2024 for Japanese Patent Application No. 2023-517230 (Note: CN 211182396 U & CN 107195807 A were cited in a prior IDS.).
International Search Report (with partial translation) and Written Opinion dated Dec. 27, 2021, for corresponding International Patent Application No. PCT/KR2021/012696.
Extended European Search Report dated Jul. 30, 2024 issued in European Patent Application No. 21869744.9. Note: CN 107 195 807 A, CN 211 182 396 U, KR 2019 0010566 A, CN 206 432 308 U and KR 2020 0005346 A cited therein are already of record.
Office Action issued on Aug. 30, 2025 in Chinese Patent Application No. 202180053434.6 (Note: CN107195807A and CN206432308U cited therein are already of record.).

* cited by examiner

BUTTON-TYPE SECONDARY BATTERY

CROSS-REFERENCE TO RELATED APPLICATION

The present application claims the benefit of the priority of Korean Patent Application No. 10-2020-0121826, filed on Sep. 21, 2020, which is hereby incorporated by reference in its entirety.

TECHNICAL FIELD

The present invention relates to a button-type secondary battery having a shape of which a diameter is greater than a height, and more particularly, to a button-type secondary battery, in which coupling force between an upper can and a lower can increases to prevent the upper can and the lower can from being separated from each other, and simultaneously, a gasket is more firmly fixed to improve sealing performance between the upper can and the lower can, thereby reducing possibility of leakage of an electrolyte.

BACKGROUND ART

A button-type battery commonly used as a coin-type battery or a button-type battery has a thin button shape of which a diameter is greater than a height and is widely used in various devices such as remote controllers, clocks, toys, computer parts, and the like.

Such a button-type battery is mainly manufactured as a non-rechargeable primary battery, but is also widely manufactured as a secondary battery that is chargeable and dischargeable as miniaturized devices are developed. Also, the button-type secondary battery also has a structure in which an electrode assembly and an electrolyte are embedded in a case to repeatedly perform charging and discharging, like the button-type secondary battery or the cylindrical or pouch-type secondary battery.

FIG. 1 is a cross-sectional view of a button-type secondary battery according to a related art.

As illustrated in the drawing, a button-type secondary battery has a structure, in which an upper can 2 and a lower can 1 are coupled to each other. Here, each of the upper can 2 and the lower can 1 has a flat cylindrical shape having a diameter greater than a height thereof, and the upper can 2 has a diameter slightly greater than that of the lower can 1.

An electrode assembly 4, in which a positive electrode, a separator, and a negative electrode are stacked, and an electrolyte (not shown) are mounted in the lower can 1. The electrode assembly 4 has a structure in which the separator, the negative electrode, the separator, and the positive electrode are put in and wound on a rotating core. Then, a negative electrode tab extending from the negative electrode and a positive electrode tab extending from the positive electrode protrude, and the negative electrode tab and the positive electrode tab are bonded to a planar part 1a of the lower can 1 and a planar part 2a of the upper can 2, respectively.

In addition, a gasket 3 having no electrical conductivity is coupled to be disposed at a point, at which the planar part 2a and the sidewall 2b of the upper can 2 are in contact with a sidewall 1b of the lower can 1, thereby preventing short-circuit from occurring when the upper can 2 and the lower can 1 are coupled to each other.

DISCLOSURE OF THE INVENTION

Technical Problem

However, the above-described coupling method has a problem in that the upper can and the lower can are separated from each other when the external impact is applied. Therefore, in order to solve the above problem, a main object of the prevent invention is to provide a button-type secondary battery, in which separation of an upper can and a lower can is prevented, and sealing performance between the lower can and the upper can is improved.

Technical Solution

The present invention for achieving the above objects provides a button-type secondary battery, in which an upper can is coupled to a lower can when an electrode assembly is mounted on the lower can, the button-type secondary battery comprising: the lower can comprising a first planar part, on which the electrode assembly is seated, and a first sidewall formed vertically along a circumference of the first planar part, wherein a concave portion is formed in the first sidewall to have a concavely recessed shape; and the upper can comprising a second planar part, which has an area that is enough to cover an opened top surface of the lower can, and a second sidewall formed vertically along a circumference of the second planar part, wherein a convex portion is formed on an inner surface of the second sidewall to convexly protrude, wherein, when the sidewall is coupled to be placed outside the first sidewall, the convex portion is fitted into the concave portion.

A portion, at which the concave portion and the convex portion may be in contact with each other, is formed to form a curved surface.

When the convex portion is fitted to be fixed to the concave portion, an end of the first sidewall and the second planar part may be spaced apart from each other.

When the gasket is coupled to the lower can to surround an end of the first sidewall, and the convex portion is fitted to be fixed to the concave portion, the gasket coupled to the end of the first sidewall and the second planar part may be spaced apart from each other.

The first sidewall may comprise: a sidewall body extending from the first planar part and having a relatively smaller inner diameter; and an expansion part extending from the sidewall body and having an inner diameter that is relatively larger than that of the sidewall body.

An inclined part having an inclined cross-section may be formed between the sidewall body and the expansion part to gradually increase in diameter.

When the upper can and the lower can are coupled to each other, the concave portion and the convex portion may be disposed closer to the first planar part than the second planar part.

The convex portion may have a shape that is concavely recessed in an outer surface of the second sidewall.

The concave portion may be provided in plurality, which are spaced apart from each other in the first sidewall, and the convex portion may be provided in the second sidewall to have the same number as the concave portion so that the convex portions and the concave portions are paired with each other.

In addition, the present invention may provide a secondary battery module, in which the plurality of button-type secondary batteries, each of which has the above configuration, are electrically connected to each other.

Advantageous Effects

According to the present invention having the above-described configuration, when the upper can and the lower can are coupled to each other, since the convex portion formed on the upper can is inserted into the concave portion formed on the lower can, the coupling force between the upper can and the lower can may increase.

The portion at which the concave portion and the convex portion are in contact with each other, may be formed as the curved surface to minimize the impact and deformation, which occur when the upper can and the lower can are coupled to each other.

When the lower can and the upper can are coupled to each other, the first sidewall of the lower can and the second planar part of the upper can may be spaced apart from each other to block the impact or vibration applied to the gasket, thereby preventing the gasket from being damaged and also preventing the short-circuit due to the damage of the gasket from occurring.

In addition, the gasket may be inserted between the first sidewall and the second sidewall and between the concave portion and the convex portion to be more firmly fixed, thereby improving the sealing performance.

The two concave portions may be formed in the first sidewall, and the same number of convex portions may be formed on the second sidewall to more increase in coupling force between the upper can and the lower can due to the increase in number of concave and convex portions.

MODE FOR CARRYING OUT THE INVENTION

Figure 1:
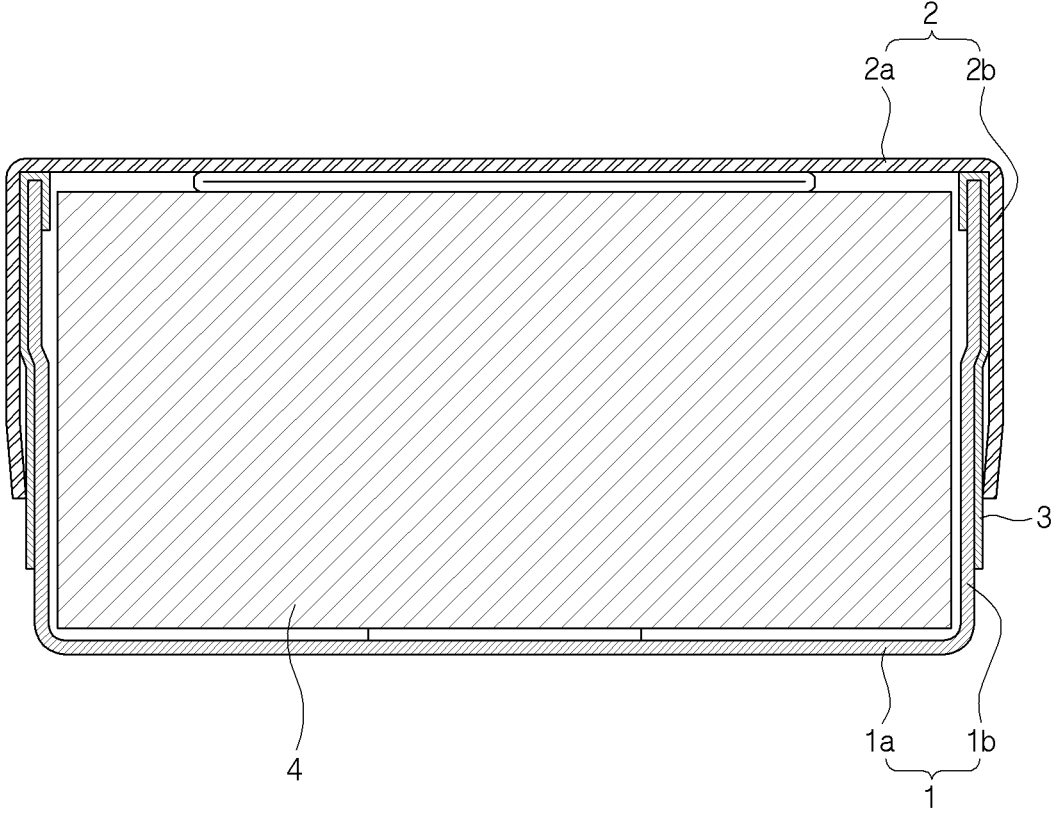
FIG. 1 is a cross-sectional view of a button-type secondary battery according to a related art.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly describe the present invention, parts irrelevant to the description are omitted, and the same reference numerals are assigned to the same or similar components throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates a button-type secondary battery having a shape of which a diameter is greater than a height. Hereinafter, embodiments of the present invention will be described in more detail with reference to the accompanying drawings.

First Embodiment

Figure 2:
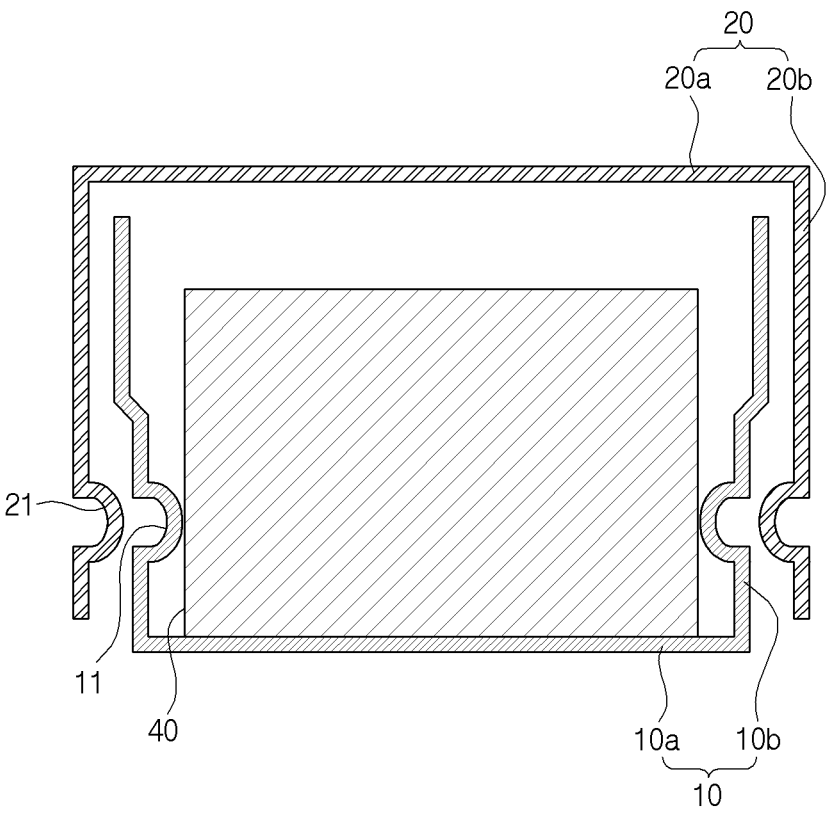
FIG. 2 is a cross-sectional view of a button-type secondary battery according to an embodiment of the present invention.
Figure 3:
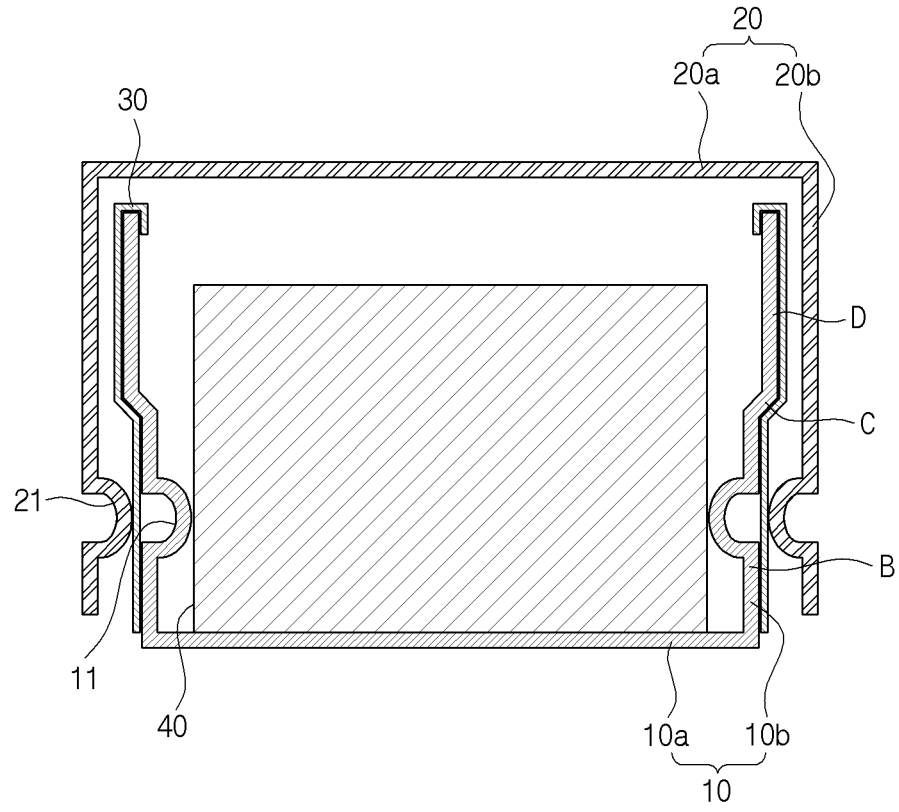
FIG. 3 is a cross-sectional view illustrating a state in which a gasket is coupled to a lower can in the state of FIG. 2.
Figure 4:
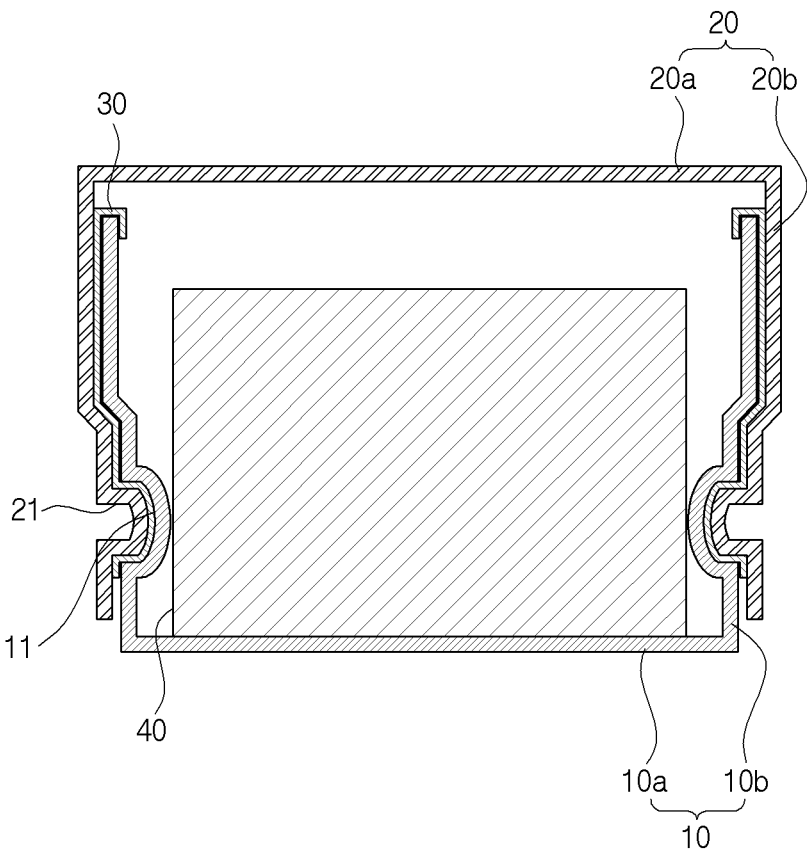
FIG. 4 is a cross-sectional view illustrating a state in which a convex portion is inserted into a concave portion in the state of FIG. 3.

FIG. 2 is a cross-sectional view of a button-type secondary battery according to an embodiment of the present invention, FIG. 3 is a cross-sectional view illustrating a state in which a gasket is coupled to a lower can in the state of FIG. 2, and FIG. 4 is a cross-sectional view illustrating a state in which a convex portion is inserted into a concave portion in the state of FIG. 3.

Referring to FIGS. 2 to 4, a button-type secondary battery provided in this embodiment has a structure in which an electrolyte is injected, and an upper can 20 is coupled to a lower can 10 when an electrode assembly 40 is mounted on the lower can 10.

The lower can 10 has a first planar part 10*a* on which the electrode assembly 40 is seated, and a first sidewall 10*b* vertically formed along a circumference of the first planar part 10*a*. The first planar part 10*a* is provided in a circular plate shape according to a diameter of the button-shaped electrode assembly 40, and the first sidewall 10*b* has a structure that is vertically erected along a circumference of the first planar part 10*b*.

Furthermore, a concave portion 11 is formed in the first sidewall 10*b* to have a concave shape in an outer surface thereof. As illustrated in the drawings, the concave portion 11 has a concave shape in the outer surface of the first sidewall 10*b* to protrude inward from an inner surface thereof.

In addition, the upper can 20 coupled to the lower can also comprises a second planar part 20*a* and a second sidewall 20*b*. The second planar part 20*a* has an area that is enough to cover an opened top surface of the lower can 20 and is formed in a circular plate shape, like the first planar part 10*a*. The second sidewall 20*b* is formed to extend vertically downward along a circumference of the second planar part 20*a*.

In addition, a convex portion 21 is formed on the second sidewall 20*b* to convexly protrude from an inner surface thereof.

The convex portion 21 is fitted into the concave portion 11 when the second sidewall 20*b* is coupled to the outside of the first sidewall 10*b*. Also, the convex part 21 is formed at a position at which a bottom surface of the second planar part 20*a* is spaced apart from an end of the first sidewall 10*b*.

Furthermore, a portion at which the concave portion 11 and the convex portion 21, which are provided in this embodiment, are in contact with each other may be formed as a curved surface so that an impact is reduced when the convex portion 21 is fitted into the concave portion 11.

As illustrated in FIG. 3, in this embodiment, the lower can 10 is provided with the gasket 30 coupled thereto. That is, when the lower can 10 and the upper can 20 are coupled to each other, the upper can 20 is connected to a positive electrode of the electrode assembly 40, and the lower can 10 is connected to a negative electrode of the electrode assembly 40.

Therefore, the gasket 30 is coupled to the lower can 10 to surround an end of the first sidewall 10b and is disposed between the upper can 20 and the lower can 20 so that the upper can 20 and the lower can 10 are insulated from each other, and the electrolyte is prevented from leaking between the upper can 20 and the lower can 10.

As illustrated in FIG. 3, the gasket 30 has an upper end, which is bent to be mounted and fixed on the end of the first sidewall 10b, and a lower end, which extends under the concave portion 11.

In addition, when the convex portion 21 is fitted into the concave portion 11, as illustrated in FIG. 4, the gasket is fitted between the concave portion 11 and the convex portion 21 as well as between the first sidewall 10b and the second sidewall 20b.

Thus, since the concave portion 11 and the convex portion 21 are additionally fixed to each other, the gasket 30 may be more firmly fixed between the lower can 10 and the upper can 20. Also, at this time, the gasket 30 may be spaced apart from the bottom surface of the second planar part 20a to block a direct impact, which may be transmitted from the second planar part 20b. Thus, the impact or vibration transmitted to the gasket 30 may be blocked to prevent the gasket from being damaged, thereby preventing short circuit due to the damage of the gasket 30 from occurring.

In this embodiment, the first sidewall 10b has a structure comprising a sidewall body B extending from the first planar part 10a and having a relatively smaller inner diameter and an extension part D extending from the sidewall body B and having an inner diameter that is relatively larger than that of the sidewall body B. Also, an inclined part C having a cross-section that is inclined to gradually increases in diameter is formed between the sidewall body B and the expansion part D.

As described above, the first sidewall 10b may have different diameters in the sidewall body B, the inclined part C, and the expansion part D, and correspondingly, when the second sidewall 20b is coupled, the second sidewall 20b may be formed to have a different diameter so that the point at which the lower can 10 and the upper can 20 are engaged with each other to improve coupling force. For reference, the sidewall 20b of the upper can 20 may be manufactured to be in close contact with the sidewall body B, the inclined part C, and the expansion part D so as to correspond to the shape of the first sidewall 10b and then be coupled through press-fitting of the upper can 20 and the lower can 10, and then, as illustrated in the drawings, after being provided in a vertical plate shape, when the upper can 20 is covered on the lower can 10, the second sidewall 20b may be pressed and molded in a lateral side so as to be in close contact with the sidewall body B, the inclined part C, and the expansion part D.

In addition, in this embodiment, when the upper can 20 and the lower can 10 are coupled to each other, it is preferable that the concave portion 11 and the convex portion 21 are disposed closer to the first planar part 10a than the second planar part 20a.

The convex portion 21 may have a shape that is concavely recessed from an outer surface of the second sidewall so that the convex portion 21 is reduced in weight and is slightly elastically deformable when the upper can 20 is coupled.

Second Embodiment

Figure 5:
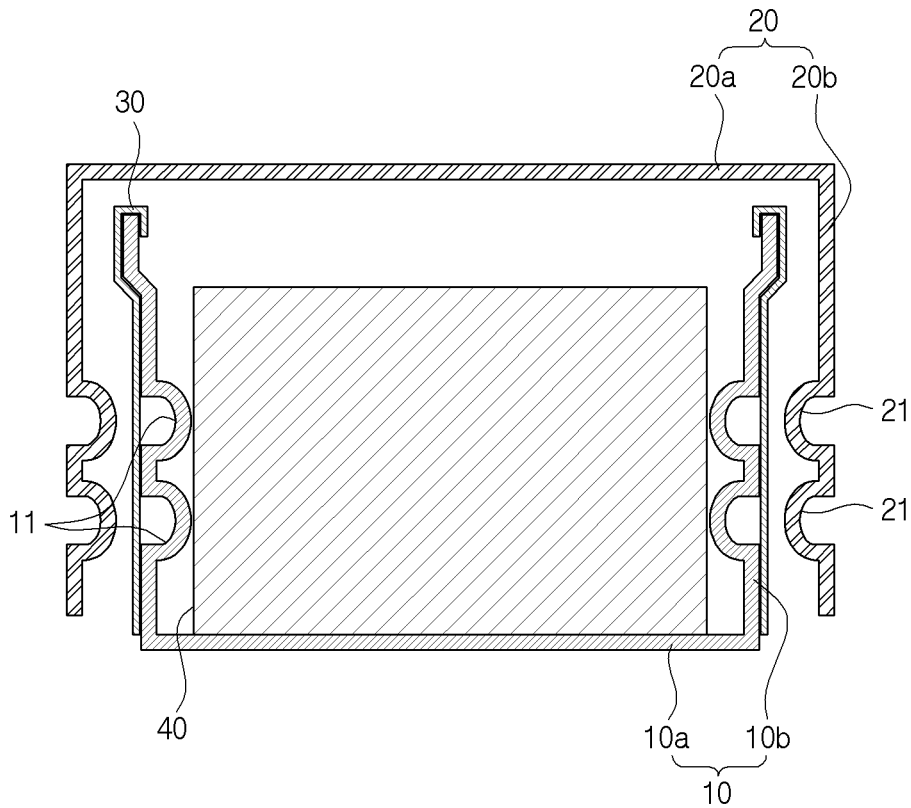
FIG. 5 is a cross-sectional view illustrating a configuration in which a plurality of concave portions and convex portions are formed.

FIG. 5 is a cross-sectional view illustrating a configuration in which a plurality of concave portions 11 and convex portions 21 are formed.

Referring to FIG. 5, a lower can 10 and an upper can provided in this embodiment are provided with a plurality of concave portions 11 and convex portions 21, respectively.

That is, in a first sidewall 10b of the lower can 10, two or more concave portions 11 may be formed with an interval therebetween. Here, the concave portions 11 do not have to have the same size and shape as each other. For example, when the upper can 20 and the lower can 10 are coupled to each other, the concave portion 11 disposed at a relatively upper side may be provided to have a shallower depth so as to easily pass through the second sidewall 20b, and the concave portion 11 disposed at a relatively lower side may be provided to have a greater depth so as to provide stronger coupling force.

In addition, the same number of convex portions 21 as the concave portions 11 are formed in the second sidewall 20b of the upper can 20 so as to be paired with the concave portions 11, respectively. The convex portions 21 have a size and shape, which are capable of being fitted and fixed to the corresponding respective concave portions 11.

In addition, in this embodiment, the gasket 30 may be fixed by being fitted between each of the concave portions 11 and each of the convex portions 21, which form a pair. Also, when the upper can 20 and the lower can 10 are coupled to each other, an upper end thereof is configured to be spaced apart from a bottom surface of the second planar part 20b.

In addition, even in this embodiment, when the lower can 10 and the upper can 20 are coupled to each other, the gasket 30 may be spaced apart from the bottom surface of the second planar part 20a to block a direct impact, which may be transmitted from the second planar part 20b. Thus, the impact or vibration transmitted to the gasket 30 may be blocked to prevent the gasket from being damaged, thereby preventing short circuit due to the damage of the gasket 30 from occurring.

In the present invention having the above-described configuration, when the upper can 20 and the lower can 10 are coupled to each other, since the convex portion 21 formed on the upper can 20 is fitted into the concave portion 11 formed in the lower can 10, coupling force between the upper can 20 and the lower can 10 may increase.

The portion at which the concave portion 11 and the convex portion 21 are in contact with each other, may be formed as the curved surface to minimize the impact and deformation, which occur when the upper can 20 and the lower can 10 are coupled to each other.

When the lower can 10 and the upper can 20 are coupled to each other, the first sidewall 10b of the lower can 10 is spaced apart from the second planar part 20a of the upper can to block the impact or vibration applied to the gasket 30, thereby preventing the gasket 30 from being damaged, and also, preventing short circuit due to the damage of the gasket from occurring.

In addition, the gasket 30 is fitted between the concave portion 11 and the convex portion 21 as well as between the first sidewall 10b and the second sidewall 20b so as to be more firmly fixed, thereby increasing in sealing performance.

Since two or more concave portions 11 are formed in the first sidewall 10b, and the convex portions 21 are formed in the same number as the concave portions 11 in the second sidewall 20b, the coupling force between the upper can 20 and the lower can 10 may more increase as the number of concave portions 11 and convex portions 21 increases.

Furthermore, the present invention may additionally provide a secondary battery module in which the plurality of button-type secondary batteries having the above characteristics are electrically connected to each other.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

10: Lower can
10a: First planar part, 10b: First sidewall
11: Concave portion
20: Upper can
20a: Second planar part, 10b: Second sidewall
21: Convex portion
30: Gasket

The invention claimed is:

1. A button-type secondary battery, comprising:
a lower can;
an upper can coupled to the lower can;
an electrode assembly on the lower can in an accommodation space defined between the lower can and the upper can; and
a gasket coupled between the upper can and the lower can,
wherein the lower can includes a first planar part, on which the electrode assembly is seated, and a first sidewall disposed vertically along a circumference of the first planar part such that a concave portion is defined in the first sidewall to have a concavely recessed shape,
wherein the upper can includes a second planar part, which has an area that covers an opened top surface of the lower can, and a second sidewall disposed vertically along a circumference of the second planar part such that a convex portion is defined on an inner surface of the second sidewall to convexly protrude,
wherein the first sidewall includes a sidewall body extending upward from the first planar part and an expansion part extending from the sidewall body, the expansion part defining an inner diameter larger than an inner diameter of the sidewall body in a plan view,
wherein the second sidewall is outside the first sidewall, and the convex portion is fitted into the concave portion, and
wherein the concave portion and the convex portion are disposed closer to the first planar part than the second planar part.

2. The button-type secondary battery of claim 1, wherein a portion, at which the concave portion and the convex portion are in contact with each other, form a curved surface.

3. The button-type secondary battery of claim 1, wherein an end of the first sidewall and the second planar part are spaced apart from each other.

4. The button-type secondary battery of claim 3, wherein the gasket is coupled to the lower can to surround an end of the first sidewall, and the gasket coupled to the end of the first sidewall and the second planar part are spaced apart from each other.

5. The button-type secondary battery of claim 1, wherein an inclined part having an inclined cross-section is disposed between the sidewall body and the expansion part to gradually increase in diameter in the plan view.

6. The button-type secondary battery of claim 1, wherein the convex portion has a shape that is concavely recessed in an outer surface of the second sidewall.

7. The button-type secondary battery of claim 1, wherein the concave portion includes a plurality of concave portions that are spaced apart from each other in the first sidewall,
wherein the convex portion includes a plurality of convex portions that are spaced apart from each other in the second sidewall, and
wherein the plurality of convex portions is provided in the second sidewall to have the same number of portions as the plurality of concave portions so that the convex portions and the concave portions are paired with each other.

8. A secondary battery module include a plurality of button-type secondary batteries of claim 1 that are electrically connected to each other.

* * * * *